(12) United States Patent
Kweon et al.

(10) Patent No.: US 9,184,887 B2
(45) Date of Patent: Nov. 10, 2015

(54) BASE STATION AND TERMINAL CONNECTION METHOD FOR THE BASE STATION

(75) Inventors: Ki Suk Kweon, Suwon-si (KR); Hyeon Jin Kang, Seoul (KR); Kill Yeon Kim, Suwon-si (KR); Yong Seok Park, Seoul (KR); Young Ki Hong, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/235,680

(22) PCT Filed: Jul. 30, 2012

(86) PCT No.: PCT/KR2012/006058
§ 371 (c)(1),
(2), (4) Date: Jan. 28, 2014

(87) PCT Pub. No.: WO2013/015662
PCT Pub. Date: Jan. 31, 2013

(65) Prior Publication Data
US 2014/0200015 A1    Jul. 17, 2014

(30) Foreign Application Priority Data

Jul. 28, 2011  (KR) .................. 10-2011-0074969

(51) Int. Cl.
*H04M 3/00*  (2006.01)
*H04L 5/00*  (2006.01)
*H04M 1/725*  (2006.01)
*H04W 76/06*  (2009.01)

(52) U.S. Cl.
CPC .......... *H04L 5/0037* (2013.01); *H04M 1/72519* (2013.01); *H04W 76/068* (2013.01)

(58) Field of Classification Search
CPC ..... H04W 88/08; H04W 8/245; H04W 84/12; H04M 1/72519
USPC ................ 455/561, 418, 550.1, 450; 370/338
See application file for complete search history.

(56) References Cited

U.S. PATENT DOCUMENTS

| | | | |
|---|---|---|---|
| 2002/0172178 A1* | 11/2002 | Suzuki et al. .................. | 370/338 |
| 2006/0088003 A1* | 4/2006 | Harris ........................... | 370/329 |
| 2009/0042560 A1 | 2/2009 | Islam et al. | |
| 2009/0052361 A1* | 2/2009 | Cai et al. ....................... | 370/311 |
| 2011/0070928 A1* | 3/2011 | Hsu et al. ...................... | 455/574 |
| 2012/0289232 A1* | 11/2012 | Ostrup et al. ................. | 455/436 |
| 2014/0022974 A1* | 1/2014 | Eriksson et al. .............. | 370/311 |
| 2014/0115150 A1* | 4/2014 | Ewanchuk et al. ........... | 709/224 |

FOREIGN PATENT DOCUMENTS

| | | |
|---|---|---|
| JP | 2003-037874 A | 2/2003 |
| KR | 10-2007-0027113 A | 3/2007 |
| KR | 10-2009-0122961 A | 12/2009 |

* cited by examiner

*Primary Examiner* — Danh Le
(74) *Attorney, Agent, or Firm* — Jefferson IP Law, LLP

(57) ABSTRACT

The present invention relates to a base station, and to a terminal connection method for the base station. The terminal connection method for the base station according to one embodiment of the present invention comprises: a step of connecting to a terminal; an information extracting step of extracting information for determining a timeout value of the connection of the terminal when the connection to the terminal is completed; and a time-out setting step of setting a time-out value of the terminal according to the extracted information. According to the one embodiment of the present invention, the base station may efficiently utilize resources and overhead expenses for connection setup may be reduced.

13 Claims, 9 Drawing Sheets

BASE STATION AND TERMINAL CONNECTION METHOD FOR THE BASE STATION

TECHNICAL FIELD

The present invention relates to a base station and a terminal connection method for the base station. In more particular, the present invention relates to a method for releasing a connection with the terminal (User Equipment; UE) served by the base station selectively and the base station for executing the same.

BACKGROUND ART

Mobile phone has been popularized to the general public in recent years. The conventional mobile phone supported only basic voice communication. Then the mobile phone evolved to such a degree to support short messaging and multimedia messaging functions. Recently, so-called smartphone is widespread in use. The smartphone allows the user to enjoy various functions such as web-surfing, game, and map services. In order to make a full use of the functions of the smartphone, high-speed data communication is inevitable.

Recently, the $3^{Rd}$ Generation Partnership Project (3GPP) has ratified significant parts of Long Term Evolution (LTE) standard. Besides, some countries have started to offer commercial LTE services. The LTE communication technology supports data communication at a data rate higher than that of Wideband Code Division Multiple Access (WCDMA). In the following, the description is directed to the communication method complying with the LTE standard. However, the present invention may be applied to other communication technologies as far as not departing from the nature of the present invention.

In the LTE communication technology, Radio Resource Control (RRC) protocol is used for radio resource allocation to the users. The RRC protocol is used in the procedure of allocating radio resource to the users and withdrawing the resources from the users who have been allocated the radio resources but not uses the resources any longer.

The RRC protocol is the protocol for use in managing the radio resource to be allocated to the terminals (User Equipment; UE) within the cell. According to the RRC protocol, the UE may be in one of two states. RRC_IDLE state is the state where the UE is not allocated any radio resource from the base station or the connection between the UE and the base station has been released. RRC_CONECTED state is the state where the UE has been allocated radio resource from the base station. In the RRC_CONNECTED state, the UE and the base station may transmit data in downlink (DL) or uplink (UL).

FIG. 1 is a diagram illustrating a connection and connection release procedure between a base station and a terminal in the conventional method. As described above, the terminal may be in one of the RRC_CONNECTED state 120 and RRC_IDLE state 110. The terminal is in the RRC_IDLE state initially. At a time point 130, the terminal receives an incoming call. If the incoming call is received, the terminal has to be allocated radio resource from the base station for data communication to transition to the RRC_CONNECTED state. Although the description is directed to the exemplary case of incoming call, the terminal has to transition to the RRC_CO-NNECTED state in other cases requiring data communication such as requesting a webpage in response to the user's manipulation. The terminal transitions to the RRC_CON-NECTED state after executing the operation for connecting to the base station during the call setup time 140. If the terminal communicates data in the RRC_CONNECTED state, it may transmit/receive data without configuration of Resource Block (RB).

However, the terminal in the RRC_CONNECTED state occupies the large resource as compared to the terminal in the RRC_IDLE state. Accordingly, if a large number of terminals served by the base station are in the RRC_CONNECTED state, this may causes call drop or call block problem due to the resource shortage. Thus, the terminals which have not perform data communication over a predetermined duration have to transition to the RRC_IDLE state. In order to accomplish this, the base station triggers an RRC inactivity timer at the time 150 right after transmitting the last data packet 190 at the time 160. If no data communication occurs before the expiry 180 of the RRC inactivity timeout 170 configured at the RRC inactivity timer, the base station sends the terminal an RRC Connection Release message to release the RRC connection. As a consequence, the terminal transitions to the RRC_IDLE state.

FIG. 2 is a flow diagram illustrating the connection and connection release procedure between the base station 210 and the terminal 205 according to the convention method.

The terminal 205 sends the base station 210 a random access preamble at step 220. The base station 210 sends the terminal 205 a random access response in reply to the random access preamble at step 225. The terminal 205 sends the base station 210 an RRC Connection Request (RRCConnectionRequest) message at step 230. The base station 210 sends the terminal 205 an RRC Connection Setup (RRCConnectionSetup) message in correspondence to the RRC Connection Request message at step 235. The terminal 205 sends the base station 210 an RRC Connection Setup Complete (RRCConnectionSetupComplete) message at step 240.

The base station 210 sends the terminal 205 a Security Mode Command (SecurityModeCommand) at step 245. The terminal 205 sends the base station 210 a Security Mode Complete (SecurityModeComplete) message at step 250. The base station 210 sends the terminal 205 an RRC Connection Reconfiguration (RRCConnectionReconfiguration) message at step 255. The terminal 205 sends an RRC Connection Reconfiguration Complete (RRCConnectionReconfigurationComplete) message at step 260. Through the procedure to step 260, a connection is established for data communication.

The data communication is performed at step 265. For the expiry of the timeout 180 of FIG. 1 or other reasons, it may be requested to release the connection between the terminal 205 and base station 210. In this case, the base station sends the terminal 205 an RRC Connection Release (RRCConnectionRelease) message at step 270. As a consequence, the connection between the terminal and the base station 210 is released, and the terminal 205 enters the RRC_IDLE state to return the occupied resource.

The smartphone user has various traffic patterns. Particularly, the user of the legacy feature phone instead of smartphone generates significantly low traffic as compared to the smartphone user. Although using the same smartphone, the different traffic patterns may be generated depending on the application installed in the smartphone. The traffic pattern may be influenced by various factors such as time and place. For example, the traffic is likely to increase in the daytime rather than nighttime when people are sleeping. Like this, the traffic pattern may vary depending on the time and place. The conventional RRC protocol applies the RRC inactivity timer set to a fixed time (timeout) to all terminals without consideration on the traffic pattern per user.

With the popularization of the smartphone, the use of the social networking applications such as Social Network Service (SNS) or Instant Messenger is widespread. These applications transmit keep-alive messages periodically for push services. The keep-alive message is small in size (1 KB) but transmitted frequently. For this reason, the terminal establishes and releases connection frequently. This results in signaling overhead in the radio network. Thus the battery consumption of the terminal increases, and the Evolved Packet System (EPS) has to take the burden of indirect cost (overhead) for processing the signaling. However, if the timer is applied in consideration of the traffic pattern per user, it is possible to use the resource efficiently and reduce the indirect cost for connection.

DISCLOSURE OF INVENTION

Technical Problem

The present invention has been proposed to solve the above problem and aims to provide a base station and connection release method of the base station that is capable of using resource efficiently and reducing the indirect cost (overhead) for connection establishment.

Also, the present invention aims to provide a base station and connection release method of the base station that is capable of reducing the power consumption of a terminal by allowing the terminal to maintain the connected state and release the connection appropriately.

Solution to Problem

In order to accomplish the above object, a terminal connection method of a base station according to an embodiment of the present invention includes extracting, when the terminal is connected, information for use in determining a timeout value of a connection of the terminal, configuring the timeout value of the terminal according to the extracted information, providing the terminal with packet communication service, and releasing, when the timeout value expires without traffic for the terminal in providing the packet communication service, the connection with the terminal.

In order to accomplish the above object, a base station to which a terminal connects according to an embodiment of the present invention includes a communication unit which establishes a connection with the terminal and provides the terminal with a packet communication service and a communication unit which extracts, when the terminal is connected, information for use in determining a timeout value of a connection of the terminal and configures the timeout value of the terminal according to the extracted information, wherein the communication unit releases, when the timeout value expires without traffic for the terminal in providing the packet communication service, the connection with the terminal.

Advantageous Effects of Invention

According to an embodiment of the present invention, the base station is advantageous in that the base station uses the resource efficiently and reduces the indirect cost (overhead) for connection establishment.

According to another embodiment of the present invention, it is advantageous to reduce the power consumption of the terminal by allowing the terminal to maintain the connected state or releases the connection appropriately.

MODE FOR THE INVENTION

Figure 1:
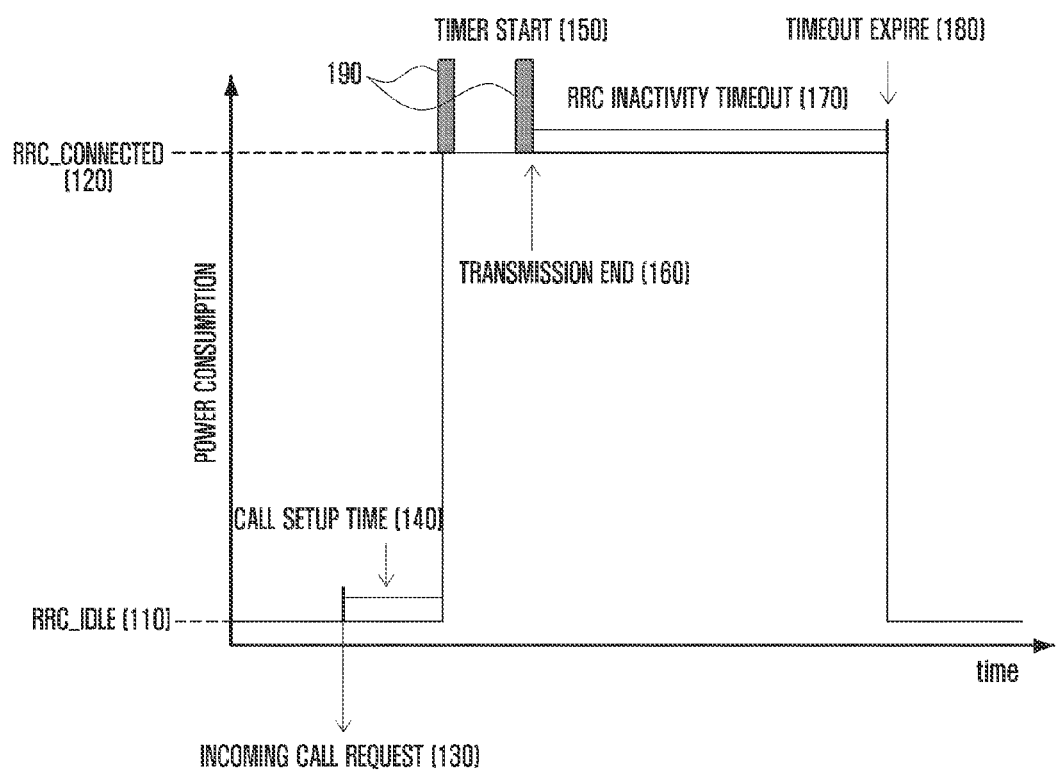
FIG. 1 is a diagram illustrating a connection and connection release procedure between a base station and a terminal in the conventional method.

Exemplary embodiments of the present invention are described with reference to the accompanying drawings in detail.

Detailed description of well-known functions and structures incorporated herein may be omitted to avoid obscuring the subject matter of the present invention. This aims to omit unnecessary description so as to make the subject matter of the present invention clear.

For the same reason, some of elements are exaggerated, omitted or simplified in the drawings and the elements may have sizes and/or shapes different from those shown in drawings, in practice. The same reference numbers are used throughout the drawings to refer to the same or like parts.

A base station and connection release method of the base station according to various embodiments of the present invention are described hereinafter with reference to accompanying drawings.

In the following, the description is directed to the LTE communication technology. However, the present invention can be applied to other communication technologies without departing from the nature of the present invention.

In the following description, the term 'traffic pattern' denotes the concept including at least one of data transmission frequency, time, data amount, and other data transmission properties.

In the following description, the term 'packet' denotes a unit of data transmission.

In the following description, the term 'burst' denotes a set of consecutive packets. If three packets are transmitted consecutively, the three packets constitute a burst. If one packet is transmitted and, after a predetermined length of pause, two other packets are transmitted, the three packets constituting two bursts.

Figure 3:
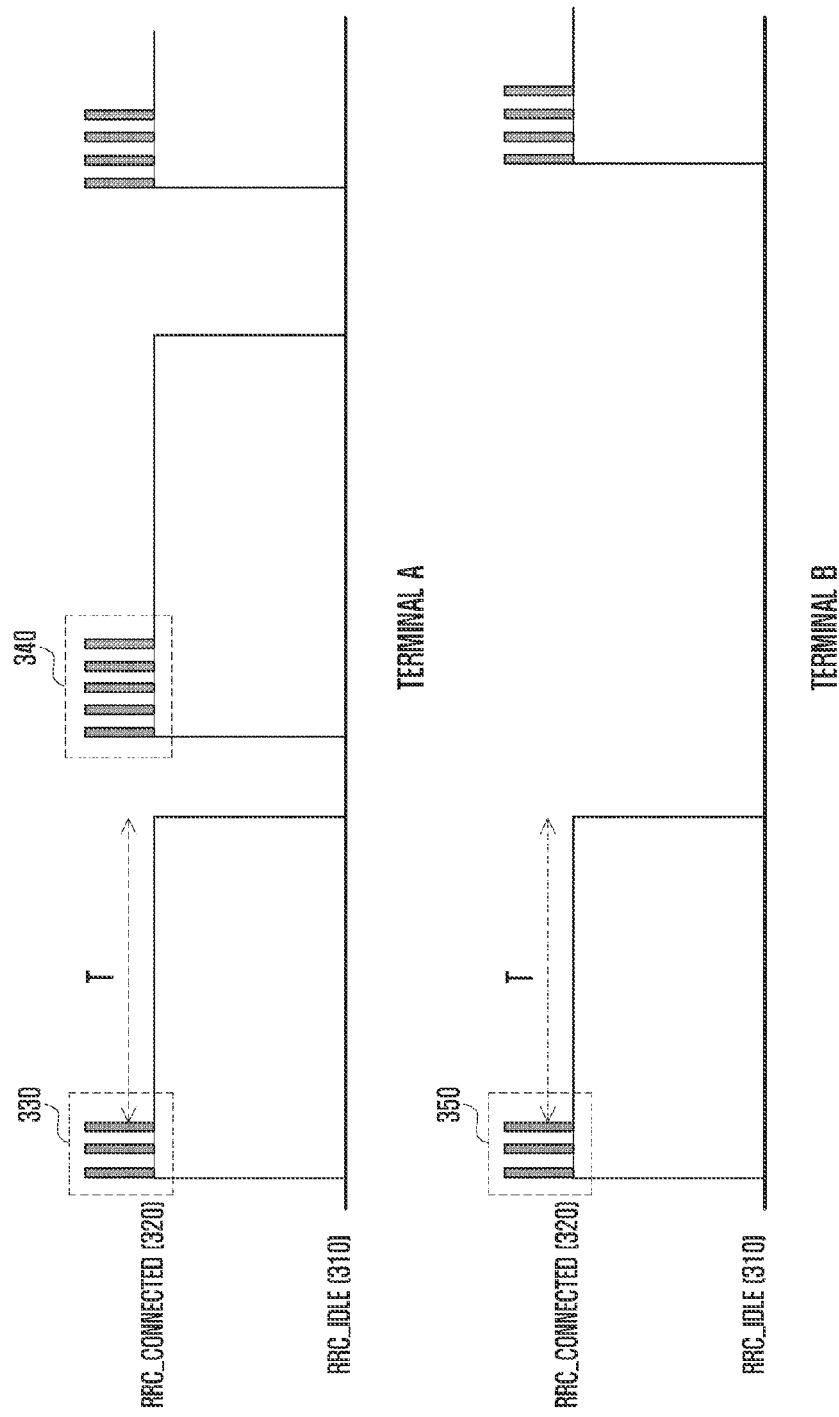
FIG. 3 is a diagram illustrating a connection method between a base station and a terminal according to the conventional method.

FIG. 3 is a diagram illustrating a connection method between a base station and a terminal according to the conventional method.

Figure 2:
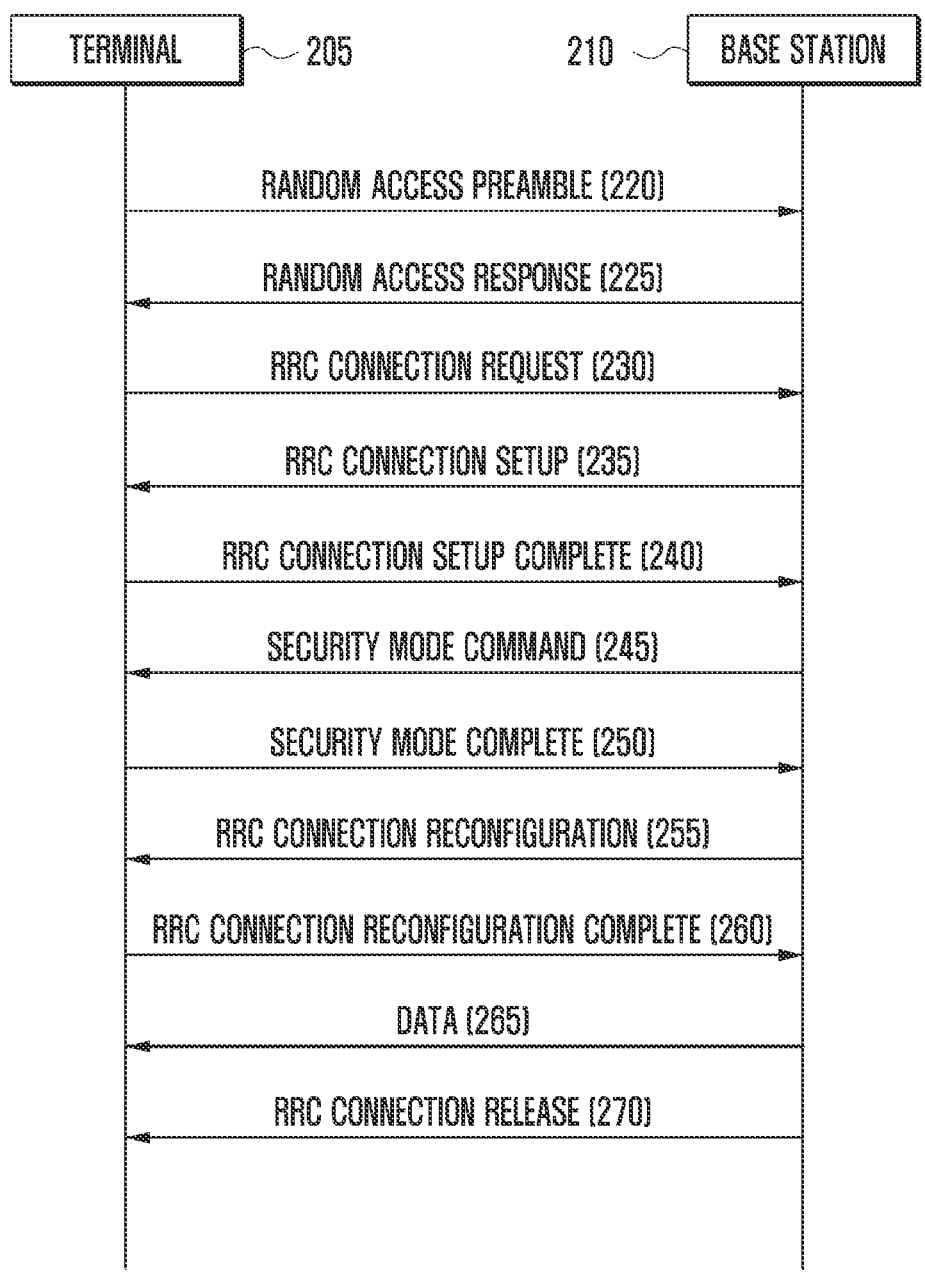
FIG. 2 is a flow diagram illustrating the connection and connection release procedure between the base station 210 and the terminal 205 according to the convention method.

The data transmission/reception patterns of terminals A and B differ from each other. Both the two terminals operate in the RRC_CONNECTED state 320 initially for transmitting data 330 and 350. If the timeout (T) elapses after the transmission of the last packet, both the terminals A and B transition to the RRC_IDLE state 310. However, the terminal A has to transmit data 340 again in a time not long after the transition to the RRC_IDLE state 310. For this reason, the terminal A transitions to the RRC_CONNECTED state 320 to transmit data 340. In order to transition to the RRC_CONNECTED state 320, there must be a signaling as shown in FIG. 2. Like this, the traffic patterns of individual terminals are different from each other, it may be inefficient to set the timeouts of the RRC inactivity timers of the terminals to the same value from the view point of the radio resource within the cell and signaling indirect cost (overhead) of EPS.

Figure 4:
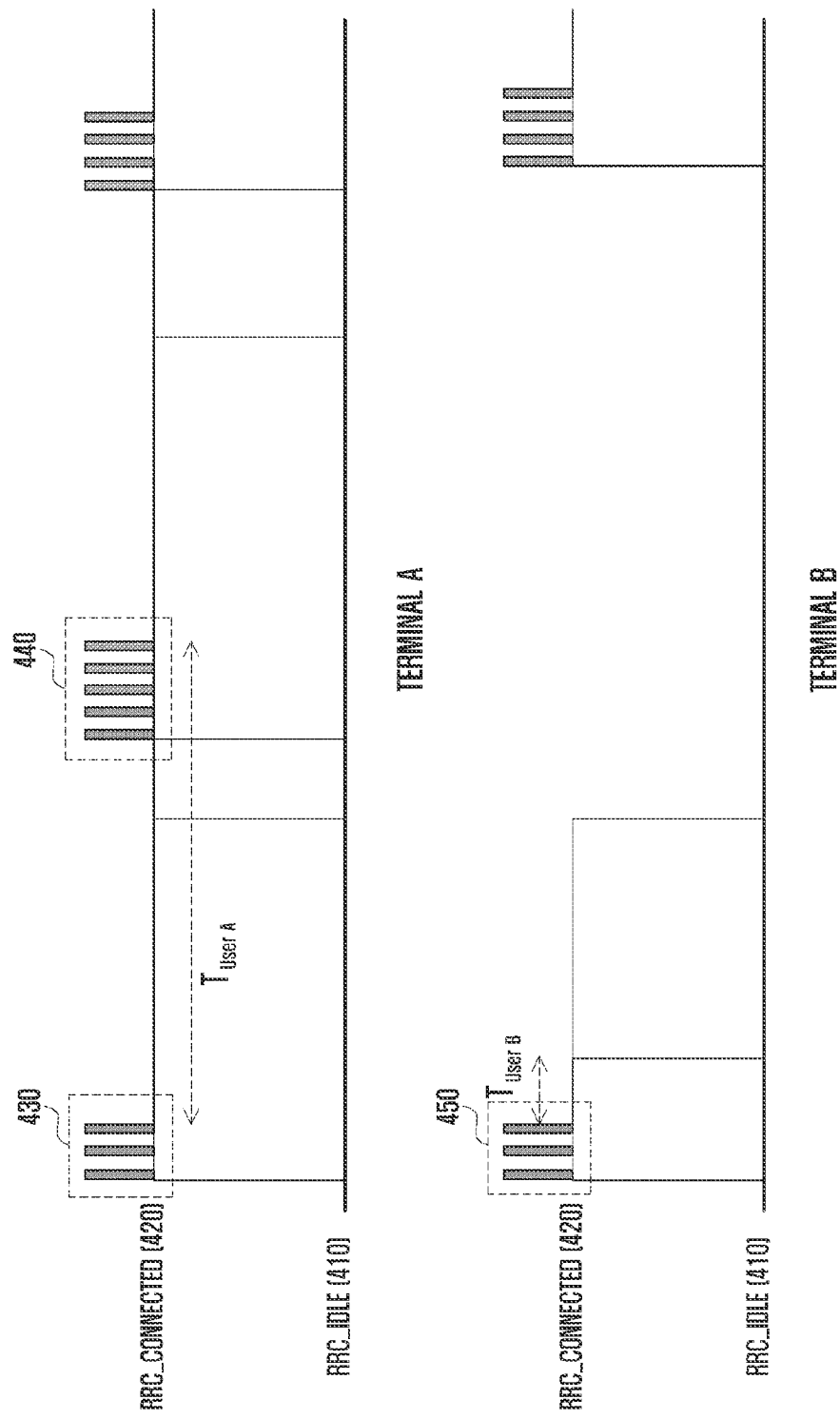
FIG. 4 is a diagram illustrating a connection method between a base station and a terminal according to an embodiment of the present invention.

FIG. 4 is a diagram illustrating a connection method between a base station and a terminal according to an embodiment of the present invention. In FIGS. 3 and 4, the data transmission patterns of the terminals are identical with each other. However, the number of transitions and transition mechanism between the RRC_CONNECTED and RRC_IDLE states are different from each other in FIGS. 3 and 4.

In the embodiment of FIG. 4, the traffic of terminal A occurs more frequently as compared to the terminal B. Accordingly, the base station may set the timeout of the terminal A ($T_{userA}$) to a relatively large value and the timeout of the terminal B ($T_{userB}$) to a relatively small value.

The base station sets the timeout of the terminal A to a relatively large value. As a consequence, the RB configuration (transition to RRC_CONNECTED state 430) of the terminal A occurs one time. Since the next data transmission performs before the expiry of the timeout value, the terminal A stays in the RRC_CONNECTED state 420 without transition to the RRC_IDLE state 410. Compared to the embodiment of FIG. 3 in which the terminal performs RB configuration three times, the number of RB configurations of terminal A decreases significantly in the embodiment of FIG. 4. Accordingly, such a processing overhead decreases in EPS. Also, since the RB configuration is not required for every data transmission, the data transmission time is reduced.

The base station sets the timeout of the terminal B to a relative small value. In this case, the terminal B transitions to the RRC_IDLE state 410 promptly, instead of staying for long time in the RRC_CONNECTED state 420 with large battery consumption, so as to decreases the battery consumption. By reducing the unnecessary radio resource allocation within the cell, the base station is capable of increasing the cell capacity.

Figure 5:
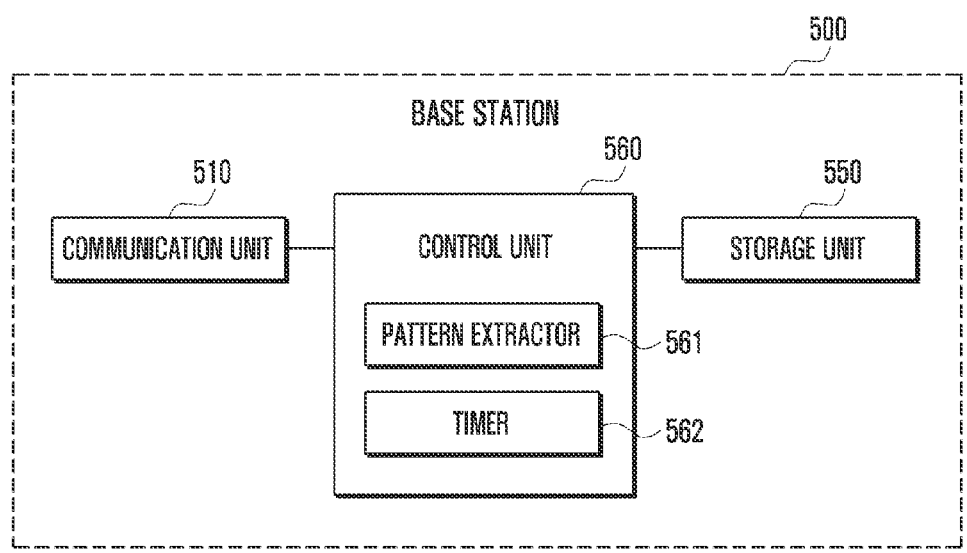
FIG. 5 is a block diagram of the base station 500 according to an embodiment of the present invention.

FIG. 5 is a block diagram of the base station 500 according to an embodiment of the present invention.

The base station 500 includes a communication unit 510, a control unit 560, and a storage unit 550. The base station may further include other components for performing normal base station functions. However, the descriptions on other components than the main components of the present invention and the components required for explaining the main components are omitted to avoid obscuring the subject matter of the present invention.

The communication unit 510 communicates with the terminal in the service area of the base station 500 under the control of the control unit 560. Particularly in an embodiment of the present invention, if the timeout for a certain terminal expires without traffic for the corresponding terminal, the communication unit 510 releases the connection with the terminal. The communication unit 510 communicates with other normal base stations.

The storage unit 550 stores data and application concerning the operations of the base station 500. Particularly in an embodiment of the present invention, the storage unit 550 may store the traffic patterns and timeout values of individual terminals served by the base station 500. Here, the traffic pattern may include at least one of frequency, time, data amount, and other properties of the previous data transmission before the establishment of the current connection. For example, the traffic pattern may include the time interval between the two recent connection establishments between the terminal and the base station and a number of bursts and/or a number of packets during the time interval. The storage unit 550 stores the data under the control of the control unit 560.

The control unit 560 controls the overall operations and components of the base station 500. According to an embodiment of the present invention, the control unit 560 includes a pattern extractor 561 and a timer 562. The pattern extractor 561 references the storage unit 550 to extract the traffic pattern of each terminal. Here, the traffic pattern may include at least one of frequency, time, data amount, and other properties of the previous data transmission before the establishment of the current connection. The traffic pattern may include the time interval between the two recent connection establishments between the terminal and the base station and a number of bursts and/or a number of packets during the time interval. The pattern extractor 561 transfers the extracted traffic pattern to the timer 562. In order to transfer the traffic pattern to the timer 562, the storage unit 550 may be used as a temporal storage space. The timer 562 may configure the degree of activity and/or timeout value according to the traffic pattern stored in the storage unit 550. The timer 562 may store the timeout value and/or degree of activity of each terminal in the storage unit 550. If the timeout of the corresponding terminal expires without traffic for the corresponding terminal, the timer 562 controls the communication unit 510 to release the connection with the corresponding terminal.

The operations of the components of the base station 500 are described in detail with reference to FIGS. 6 and 7.

Figure 6:
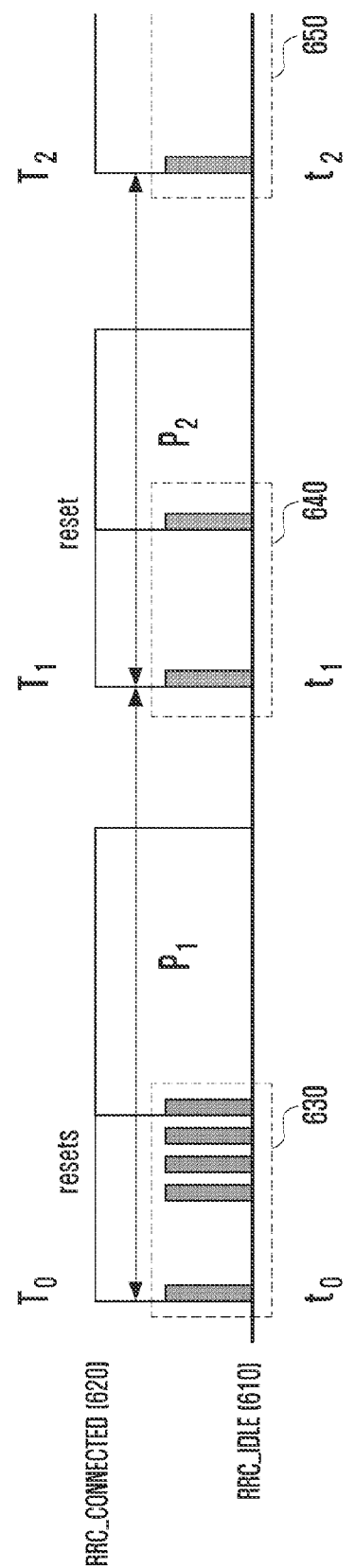
FIG. 6 is a diagram illustrating a terminal connection and connection release procedure of the base station 500 according to an embodiment of the present invention.

FIG. 6 is a diagram illustrating a terminal connection and connection release procedure of the base station 500 according to an embodiment of the present invention.

The communication unit 510 starts the connection procedure at time point $t_0$. Accordingly, the terminal transitions from the RRC_IDLE state 610 to the RRC_CONNECTED state 620. If the terminal connects to the base station, the base station 500 calculates the timeout $T_0$ to be applied to the corresponding terminal in the procedure to be described hereinafter. The calculation method is described in explaining the time point $t_1$. During the connection starting at time point $t_0$, a plurality of packets are transmitted. The timer is reset at every packet transmission. After the last packet is transmitted and the timeout $T_0$ elapses with no more packet transmission, the timer 562 controls the communication unit 510 to release the connection with the corresponding terminal.

Afterward, the communication unit 510 performs connection establishment with the corresponding terminal again at time $t_1$. If the terminal connects to the base station, the pattern extractor 561 extracts the traffic pattern of the corresponding terminal. For example, the traffic pattern may include at least one of frequency, time, data amount, and other properties of the previous data transmission before the establishment of the current connection. Here, the description is made under the assumption that the traffic pattern may include the time interval between the two recent connection establishments between the terminal and the base station and a number of bursts and/or a number of packets during the time interval.

In the embodiment of FIG. 6, the time interval between the recent two connection establishments between the corresponding terminal and the base station is $P_1$. That is, the corresponding time interval is the time interval between the time point when the current connection has been established and the time point when the connection right before had been established. The pattern extractor 561 sends the timer 562 the number of packets and/or the number of bursts occurred during the corresponding time interval.

The number of bursts and/or the number of packets may be used in determining the traffic pattern. It is characterized as follows depending on the value to be used. Accordingly, those who practices the present invention may use any or combination of the two.

In the case of using the number of packets for determining the traffic pattern, if the data transmission is sporadic but voluminous, it is recognized that traffic is active. Otherwise if the data transmission is frequent but tiny in amount, it is recognized that traffic is inactive.

In the case of using the number of bursts for determining the traffic pattern, if the data transmission is sporadic but voluminous, it is recognized that the traffic is inactive. Otherwise if the data transmission is frequent but tiny in amount, it is recognized that the traffic is active.

In the following, it is assumed that the number of packets is used.

The timer 562 may calculate the timeout value using the transmission time interval and the number of packets. For this purpose, the timer 562 calculates the degree of activity using the transmission time interval and number of packets.

The degree of activity D may be calculated according to equation (1).

$$D = \text{number of packets/time interval} \quad (1)$$

Here, the number of packets and time interval are the values extracted by the pattern extracted 561 as described above.

However, equation (1) is just an example. The timer 562 may calculate the degree of activity in other methods using the received time interval and the number of packet. The timer 562 also may use the number of bursts or the combination of the number of packets and the number of bursts instead of using the number of packet. However, the calculation method has to assess that the degree of activity decreases as the time interval increases and increases as the number of packets increases. Next, the timer 562 configures the timeout value based on the degree of activity D. For example, the degree of activity D and the timeout $T_c$ may be mapped as shown in table 1.

TABLE 1

| D | $T_{current}$ (second) |
|---|---|
| Interval 1 (D < a) | 15 |
| Interval 2 (a ≤ D < b) | 20 |
| Interval 3 (b ≤ D < c) | 25 |
| Interval 4 (c ≤ D < d) | 30 |
| Interval 5 (d ≤ D < e) | 35 |
| Interval 6 (e ≤ D) | 40 |

For example, if the calculated D in the range of interval 3, the timer 562 may set the timeout $T_{current}$ to 25 seconds. The calculated timeout $T_{current}$ (=T1) is applied to the connection at time $t_1$. Accordingly, if $T_1$ elapses since the transmission of the last packet among the packets 640, the communication unit 510 may control the communication unit 510 to release the connection with the corresponding terminal.

Afterward, the communication unit 510 performs connection establishment with the corresponding terminal again at time $t_2$. Likewise, it calculates a new timeout $T_2$ based on the time interval $P_2$ and the number of packets/busts during $P_2$. The base station releases the connection with the terminal according to $T_2$.

According to an alternative embodiment of the present invention, the timeout value of the previous connection may be used for determining a new timeout value. Even in this case, the aforementioned time interval and the number of packets/bursts during the time interval may be used together.

According to an alternative embodiment, the timer 562 may store the timeout $T_0$ for the connection at time $t_0$ in the storage unit 550. As described above, the communication unit 510 performs connection process with the corresponding terminal at time $t_1$. At this time, it is possible to use the timeout $T_0$ of the previous connection in calculating the new timeout. In order to achieve this, equation (2) may be used.

$$T_{new} = \alpha T_{prev} + \beta T_{current} (\text{here, } \alpha + \beta = 1) \quad (2)$$

$T_{new}$ denotes timeout value to be used for the connection at time $t_1$. $\alpha$ and $\beta$ denote weights, and $T_{prev}$ denotes the timeout of the previous connection, i.e. $T_0$. $T_{current}$ may be the value calculated as described in the above embodiment, e.g. calculated using equation (1).

The calculation using equation 2 is just an example. The timeout $T_{prev}$ may be used differently in the procedure of calculating $T_{new}$. According to an alternative embodiment, the $T_{new}$ has to be calculated such that the $T_{new}$ increases as $T_{prev}$ increases.

According to an alternative embodiment, the previous timeout values accumulated are reflected. In this case, the influence of the abrupt change of the traffic pattern may be diminished. Also, the base station is capable of reflecting the traffic pattern used before the abrupt change of the traffic pattern so as to apply the timeout value matching the averaged traffic pattern.

Figure 7:
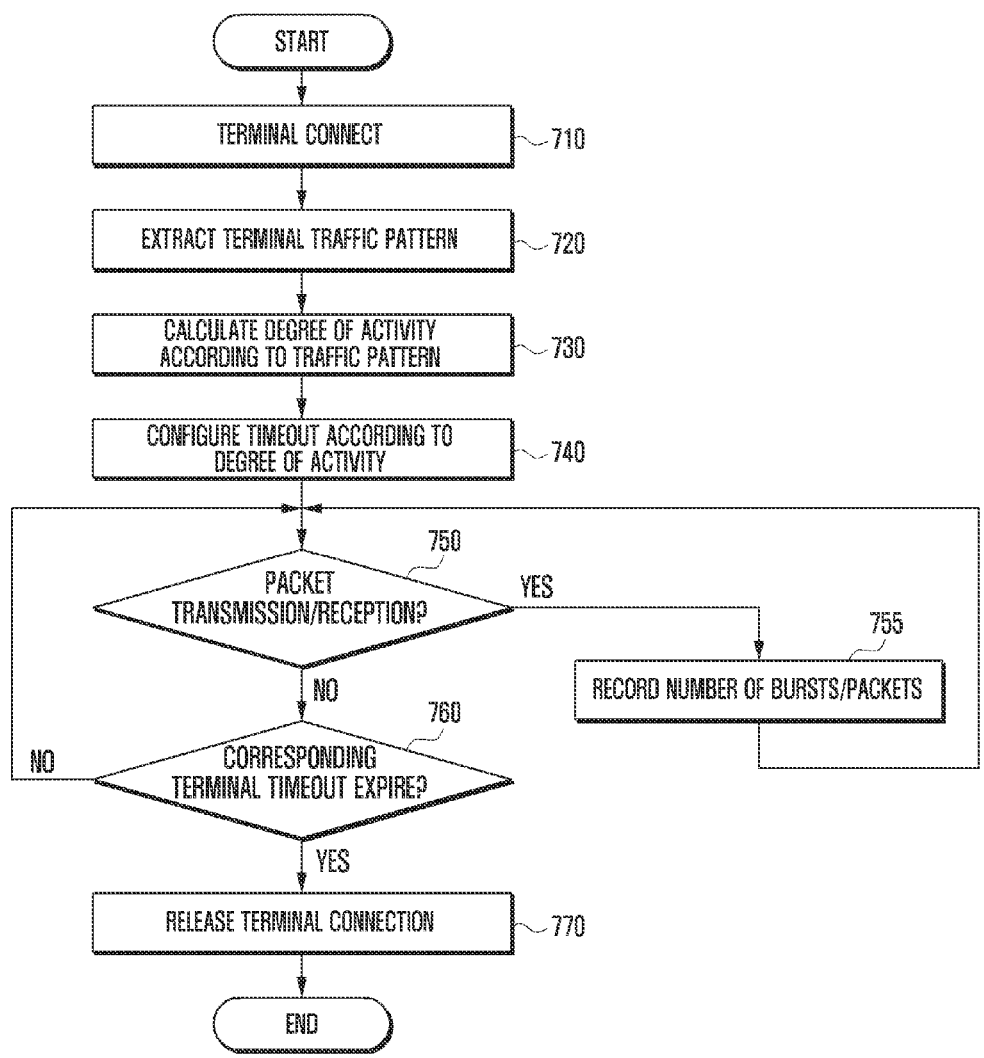
FIG. 7 is a flowchart illustrating a terminal connection and connection release procedure of the base station 500 according to an embodiment of the present invention.

FIG. 7 is a flowchart illustrating a terminal connection and connection release procedure of the base station 500 according to an embodiment of the present invention.

The communication unit 510 establishes a connection with the terminal at step 710. If the communication unit 510 has established the connection with the terminal, the pattern extractor 561 extracts the traffic pattern of the terminal at step 720. The traffic pattern may include at least one of frequency, time, data amount, and other properties of the previous data transmission before the establishment of the current connection. Here, description is made under the assumption that the traffic pattern includes the time interval between the two recent connection establishments between the terminal and the base station and a number of bursts and/or a number of packets during the time interval. The extracted traffic pattern is transferred to the timer 562.

The timer 562 calculates the degree of activity according to the traffic pattern at step 730. Since the method for calculating the degree of activity has been described with reference to FIG. 6 and equation (1), detailed description thereon is omitted herein.

The timer 562 configures the timeout according to the degree of activity at step 740. Since the method for configuring the timeout based on the degree of activity has been described with reference to FIG. 6 and table 1, detailed description thereon is omitted herein. When configuring the timeout value, the alternative embodiment of using the timeout value of the previous connection may be applied.

The control unit 560 determines whether any packet is transmitted/received to/from the corresponding terminal at step 750. If any packet is transmitted/received, the control unit records the number of bursts and/or packets in the storage unit 550 at step 755. The number of bursts and/or packets stored in this way forms the traffic pattern for use in determining the timeout of the next connection. If the packet transmission/reception exists, the procedure goes to step 760.

The timer 562 determines whether the timeout expires in the state without traffic for the corresponding terminal since the last packet transmission/reception at step 760. If the timeout of the corresponding terminal is not expired, the terminal repeats steps 750 and 760 until the timeout of the corresponding terminal expires. If the timeout of the corresponding terminal expires, the procedure goes to step 770. At step 770, the timer 562 controls the communication unit 510 to release the connection with the corresponding terminal.

Figure 8:
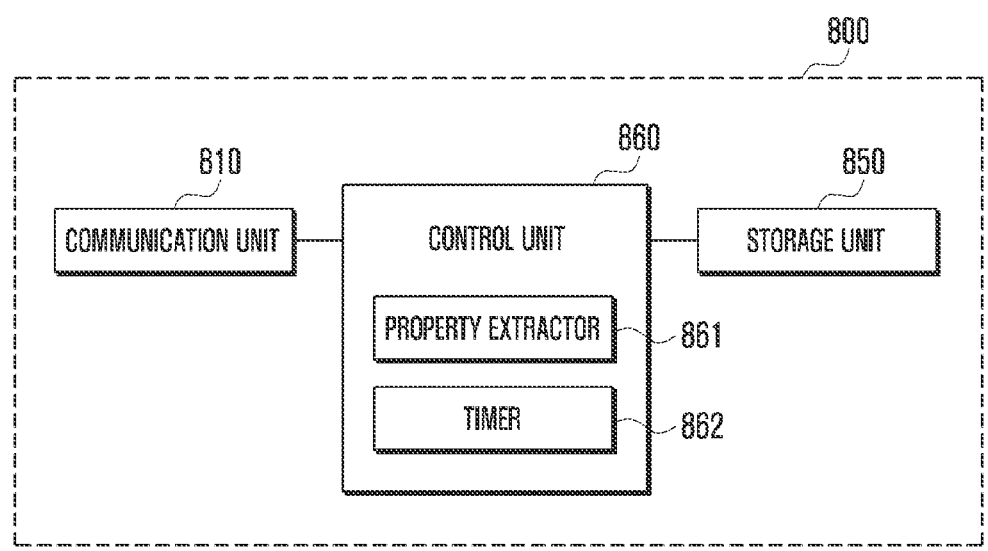
FIG. 8 is a block diagram illustrating a base station according to an embodiment of the present invention.

FIG. 8 is a block diagram illustrating the base station 800 according to another embodiment of the present invention.

The base station 800 adjusts the timeout based on the information other than the traffic pattern unlike the base station 500 of FIG. 5.

The base station 800 includes a communication unit 810, a control unit 860, and a storage unit 850. The base station may further include more components for perform the normal functions of the base station. However, the descriptions on other components than the main components of the present invention and the components required for explaining the main components are omitted to avoid obscuring the subject matter of the present invention.

The communication unit 810 communicates with the terminal in the service area of the base station 800 under the control of the control unit 860. Particularly in this embodiment, if the timeout for a certain terminal expires without traffic for the corresponding terminal, the communication unit 810 releases the connection with the terminal. The communication unit 510 performs communications of other normal base station.

The storage unit 850 stores data and application concerning the operations of the base station 800. Particularly in an embodiment of the present invention, the storage unit 850 may store the connection properties and timeout values of individual terminals served by the base station 800. Here, the connection pattern may include at least one of timeout value to be applied to the corresponding connection, type of the corresponding connection, and information necessary for extracting/acquiring the timeout value. The storage unit 850 stores the aforementioned data under the control of the control unit 860. In the case that the storage unit 859 stores the type of connection, a table indicating the relationship between the connection type and timeout value or similar data structure may be stored in the storage unit 850.

The control unit 860 controls the overall operations and components of the base station 800. Particularly in an embodiment of the present invention, the control unit 860 includes a property extractor 861 and a timer 862. The property extractor 861 references the storage unit 850 to extract connection properties. Here, the connection property may include at least one of timeout value to be connected to the corresponding connection, type of the corresponding connection, and other information necessary for extracting/acquiring the timeout value. The property extractor 861 sends the extracted connection property to the timer 862. In order to send the traffic pattern to the timer 862, the storage unit 850 may be used as temporal storage space. The timer 862 configures the timeout value of the corresponding terminal according to the connection properties stored in the storage space 850. The timer 862 may store the timeout value of each terminal in the storage unit 850. If the timeout of the corresponding terminal expires without traffic for the corresponding terminal, the timer 862 controls the communication unit 810 to release the connection with the corresponding terminal.

The operations of the components of FIG. 8 are described in detail hereinafter with reference to FIG. 9.

Figure 9:
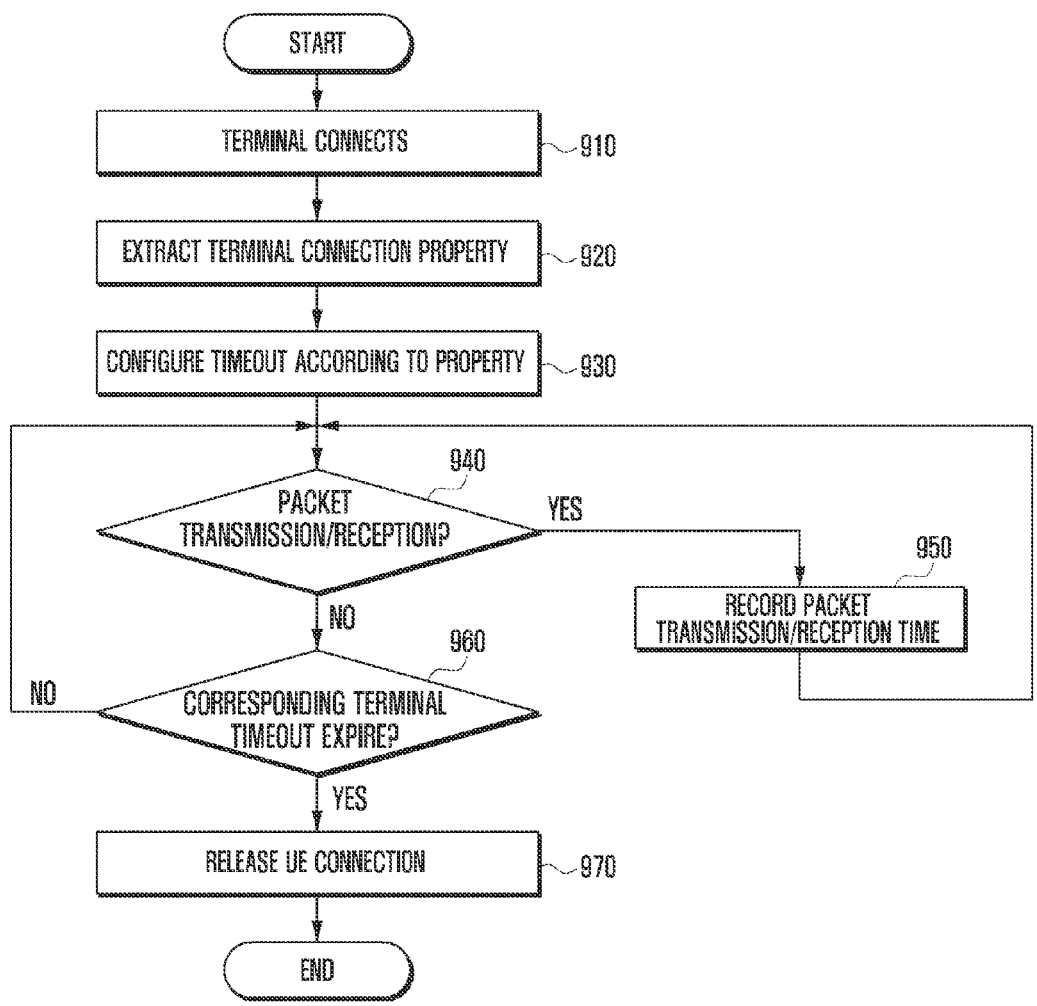
FIG. 9 is flowchart illustrating a terminal connection and connection release procedure of a base station according to an embodiment of the present invention.

FIG. 9 is a flowchart illustrating the terminal connection and connection release procedure of the base station 800 according to another embodiment of the present invention.

Referring to FIG. 9, the communication unit 810 establishes a connection with the terminal at step 910. If the communication unit 810 establishes the connection with the terminal, the property extractor 861 extracts the connection properties of the terminal at step 920. The connection properties may include at least one of timeout value to be connected to the corresponding connection, type of the corresponding connection, and other information necessary for extracting/acquiring the timeout value.

For example, the base station 800 may receive an indicator indicating the timeout value to be applied to the connection with the corresponding terminal from the terminal. In this case, the property extractor 861 may store the timeout value indicated by the timeout value indicator received from the terminal as the connection property.

According to an alternative embodiment, the base station 800 may receive the information for use in estimating or computing the timeout value to be applied to the connection with the corresponding terminal from the terminal. For example, the base station 800 may receive the information on application requesting for the connection and the protocol for use in the connection (HyperText Transfer Protocol (HTTP), File Transfer Protocol (FTP), Real-time Transport Protocol (RTP), etc.) from the terminal. The property extractor 861 may compute the timeout value corresponding to the information based on the received information. In the broad sense, if the base station 800 receives the timeout value from the terminal directly, the timeout value received from the terminal may be the information necessary for calculating the timeout value to be allocated to the connection with the corresponding terminal.

According to an alternative embodiment, if a connection request is received from the terminal, the base station requests an external network to establish a bearer and receives a Quality of Service (QoS) indicator for the corresponding connection from a Policy control and Charging Rule Function (PCRF) or a similar external entity. In this case, the property extractor 861 may store the corresponding QoS indicator or an identifier as the property of the corresponding property.

The extracted connection property is sent to the timer 862.

The timer configures timeout according to the connection property at step 930. If the timeout value received form the terminal is the connection property, the timeout may be configured according to the corresponding timeout value. If the QoS indicator concerning the corresponding connection which is received from the external entity is the connection property, the timeout value for the corresponding connection is set to the timeout value indicated by the QoS indicator. In this case, the storage unit 850 stores the QoS indicator or identifier capable of identifying it and the timeout value in the form of table or similar data structure. For example, in the case of the connection for keep-alive packet, the PCRF or other external entity provides the base station 800 with the corresponding QoS indicator (QoS information). Accordingly, the base station 800 may configure the timeout value matching the QoS of the corresponding connection.

The control unit 860 determines whether any packet is transmitted/received to and from the corresponding terminal at step 940. If any packet is transmitted/received, the control unit 860 records the packet transmission/reception time at step 950. Since the terminal ends the connection after the timeout expires without packet transmission/reception since the last packet transmission/reception, it is necessary to record the last packet transmission/reception time of each connection. If no packet transmission/reception exists, the procedure goes to step 960.

At step 960, the terminal 862 determines whether the timeout of the corresponding terminal has expired without traffic for the corresponding terminal since the last packet transmission/reception. If the timeout of the corresponding terminal has not expired, steps 940 and 950 are repeated until the timeout of the corresponding terminal elapses. If the timeout of the corresponding terminal has expired, the procedure goes to step 970. At step 970, the timer 862 controls the communication unit 810 to release the connection with the corresponding terminal.

In the embodiments of FIGS. 5 to 7, the traffic pattern is acquired/analyzed to configure the timeout value for connection. In the embodiment of FIGS. 8 and 9, however, the property on the connection acquired/analyzed to configure the timeout value for the connection. The traffic pattern and the connection property may be referred to as 'information for determining the timeout value' integrally.

It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Furthermore, the respective block diagrams may illustrate parts of modules, segments or codes including at least one or more executable instructions for performing specific logic function(s). Moreover, it should be noted that the functions of the blocks may be performed in different order in several modifications. For example, two successive blocks may be performed substantially at the same time, or may be performed in reverse order according to their functions.

The term "module" according to the embodiments of the invention, means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more CPUs in a device or a secure multimedia card.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

Although exemplary embodiments of the present invention have been described in detail hereinabove with specific terminology, this is for the purpose of describing particular embodiments only and not intended to be limiting of the invention. While particular embodiments of the present invention have been illustrated and described, it would be obvious to those skilled in the art that various other changes and modifications can be made without departing from the spirit and scope of the invention.

The invention claimed is:

1. A terminal connection method of a base station, the method comprising:
    extracting, if the terminal is connected, information on a traffic pattern of previous transmission for use in determining a timeout value of a connection of the terminal;
    configuring the timeout value of the terminal according to the extracted information;
    providing the terminal with packet communication service; and
    releasing, if the timeout value expires without traffic for the terminal in providing the packet communication service, the connection with the terminal.

2. The method of claim 1, wherein the extracting of the information comprises:
    extracting a time interval between two recent connection establishments between the terminal and the base station; and
    extracting a number of bursts or a number of packets during the time interval.

3. The method of claim 2, wherein the configuring of the timeout value comprises:
    extracting a value obtained by dividing the number of bursts or packets by the extracted time interval as a degree of activity; and
    configuring the timeout value according to the degree of activity.

4. The method of claim 2, wherein the configuring of the timeout value comprises:
    extracting an old timeout value configured lastly before current time;
    extracting a value obtained by dividing the number of bursts or packets by the old time interval as a degree of activity; and configuring the timeout value according to the old timeout value and the degree of activity.

5. The method of claim 4, wherein the configuring of the timeout value comprises calculating the timeout value $T_{new}$ according to the following equation:

$$T_{new} = \alpha T_{prev} + \beta T_{current} (\text{here, } \alpha+\beta=1)$$

where $\alpha$ and $\beta$ denote weights, $T_{prev}$ denotes the old timeout value, $T_{current}$ denotes the timeout value extracted according to the degreed of activity.

6. The method of claim 1, wherein the extracting of the information comprises:
 receiving Quality of Service (QoS) for the connection of the terminal; and
 extracting the QoS information as the information for determining the timeout value.

7. The method of claim 1, wherein the extracting of the information comprises:
 receiving information necessary for calculating the timeout value of the terminal from the terminal; and
 extracting the received information as the information for determining the timeout value.

8. A base station to which a terminal connects, the base station comprising:
 a communication unit configured to transmit and receive a signal; and
 a control unit configured to:
  control to extract if the terminal is connected, information on a traffic pattern of previous transmission for use in determining a timeout value of a connection of the terminal and configures the timeout value of the terminal according to the extracted information,
  configure the timeout value of the terminal according to the extracted information, to provide the terminal with packet communication service, and
  release, if the timeout value expires without traffic for the terminal in providing the packet communication service, the connection with the terminal.

9. The base station of claim 8, wherein the controller is further configured to control to:
 extract a time interval between two recent connection establishments between the terminal and the base station, and
 extract a number of bursts or a number of packets during the time interval.

10. The base station of claim 9, wherein the controller is further configured to:
 control to extract a value obtained by dividing the number of bursts or packets by the extracted time interval as a degree of activity, and
 configure the timeout value according to the degree of activity.

11. The base station of claim 9, wherein the control unit is further configured to:
 extract an old timeout value configured lastly before current time,
 extract a value obtained by dividing the number of bursts or packets by the old time interval as a degree of activity, and
 configure the timeout value according to the old timeout value and the degree of activity.

12. The base station of claim 11, wherein the timer calculates the timeout value $T_{new}$ according to the following equation:

$$T_{new} = \alpha T_{prev} + \beta T_{current} (\text{here, } \alpha+\beta=1)$$

where $\alpha$ and $\beta$ denote weights, $T_{prev}$ denotes the old timeout value, $T_{current}$ denotes the timeout value extracted according to the degreed of activity.

13. The base station of claim 8, wherein the control unit is further configured to:
 receive Quality of Service (QoS) for the connection of the terminal, and
 extract the QoS information as the information for determining the timeout value.

* * * * *